(12) United States Patent
Nakata et al.

(10) Patent No.: US 9,937,800 B2
(45) Date of Patent: Apr. 10, 2018

(54) VEHICLE

(71) Applicant: TOYOTA JIDOSHA KABUSHIKI KAISHA, Toyota-shi, Aichi-ken (JP)

(72) Inventors: Daisuke Nakata, Seto (JP); Tetsuya Miyazaki, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 105 days.

(21) Appl. No.: 14/912,469

(22) PCT Filed: Aug. 18, 2014

(86) PCT No.: PCT/IB2014/001550
§ 371 (c)(1),
(2) Date: Feb. 17, 2016

(87) PCT Pub. No.: WO2015/028858
PCT Pub. Date: Mar. 5, 2015

(65) Prior Publication Data
US 2016/0200199 A1 Jul. 14, 2016

(30) Foreign Application Priority Data

Aug. 26, 2013 (JP) ................................ 2013-174222

(51) Int. Cl.
*B60T 1/10* (2006.01)
*B60L 7/26* (2006.01)
(Continued)

(52) U.S. Cl.
CPC ........... *B60L 7/26* (2013.01); *B60K 6/22* (2013.01); *B60T 1/065* (2013.01); *B60T 1/10* (2013.01);
(Continued)

(58) Field of Classification Search
CPC .......... B60T 1/10; B60T 1/065; B60T 8/4081; B60T 13/586; B60T 2270/604;
(Continued)

(56) References Cited

U.S. PATENT DOCUMENTS 6,164,734 A * 12/2000 Otomo .................... B60T 7/042
188/1.11 E
6,325,471 B1 * 12/2001 Curran .................. B60T 8/4072
303/113.4
(Continued)

FOREIGN PATENT DOCUMENTS

EP 2474437 A1 7/2012
EP 2481649 A1 8/2012
(Continued)

*Primary Examiner* — Thomas W Irvin
(74) *Attorney, Agent, or Firm* — Oliff PLC

(57) ABSTRACT

A vehicle includes: a friction braking device configured to generate a friction braking force; a generator motor configured to generate a regenerative braking force; and a control unit configured to adjust the friction braking force and adjust the regenerative braking force by controlling energization of the generator motor such that a braking force that is required by the vehicle is generated, interrupt energization of the generator motor at predetermined timing after timing at which a duration of an occupant's specific operation is equal to a threshold time, and control the regenerative braking force such that the regenerative braking force gradually reduces within a specific period from operation detection timing, at which the specific operation has been detected, to the predetermined timing when the regenerative braking force is being generated at the operation detection timing.

7 Claims, 6 Drawing Sheets

(51) Int. Cl.
*B60K 6/22* (2007.10)
*B60T 1/06* (2006.01)
*B60T 13/58* (2006.01)
*B60T 8/40* (2006.01)

(52) U.S. Cl.
CPC ........... *B60T 13/586* (2013.01); *B60T 8/4081* (2013.01); *B60T 2270/604* (2013.01); *B60Y 2200/92* (2013.01); *B60Y 2300/91* (2013.01); *B60Y 2400/81* (2013.01); *Y10S 903/904* (2013.01)

(58) Field of Classification Search
CPC .. B60K 6/22; B60Y 2200/92; B60Y 2300/91; B60Y 2400/81
USPC .................................................. 303/151, 152
See application file for complete search history.

(56) References Cited

U.S. PATENT DOCUMENTS

| | | | | |
|---|---|---|---|---|
| 7,597,408 B2* | 10/2009 | Kim | ............ | B60L 7/10 303/122.03 |
| 8,370,041 B2* | 2/2013 | Gabor | ............ | B60T 13/46 303/115.4 |
| 8,544,963 B2* | 10/2013 | Yamamoto | ............ | B60T 7/042 303/11 |
| 8,738,260 B2* | 5/2014 | Miyazaki | ............ | B60T 1/10 180/65.265 |
| 8,768,552 B2* | 7/2014 | Krueger | ............ | B60T 1/10 303/152 |
| 8,880,317 B2* | 11/2014 | Gabor | ............ | B60T 17/02 303/115.4 |
| 8,991,942 B2* | 3/2015 | Koyama | ............ | B60T 1/10 303/11 |
| 9,718,359 B2* | 8/2017 | Crombez | ............ | B60K 35/00 |
| 2009/0062991 A1 | 3/2009 | Hayashikawa et al. | | |
| 2010/0114448 A1* | 5/2010 | Gabor | ............ | B60T 13/46 701/79 |
| 2012/0158266 A1* | 6/2012 | Miyazaki | ............ | B60W 10/18 701/70 |
| 2013/0049945 A1* | 2/2013 | Crombez | ............ | B60T 1/10 340/453 |
| 2013/0062932 A1 | 3/2013 | Yagashira | | |
| 2014/0195133 A1* | 7/2014 | Kato | ............ | B60T 1/10 701/78 |
| 2016/0264002 A1* | 9/2016 | Suda | ............ | B60T 1/10 |

FOREIGN PATENT DOCUMENTS

| | | |
|---|---|---|
| JP | 2005-199748 A | 7/2005 |
| JP | 2009-056920 A | 3/2009 |
| JP | 2011-056969 A | 3/2011 |

* cited by examiner

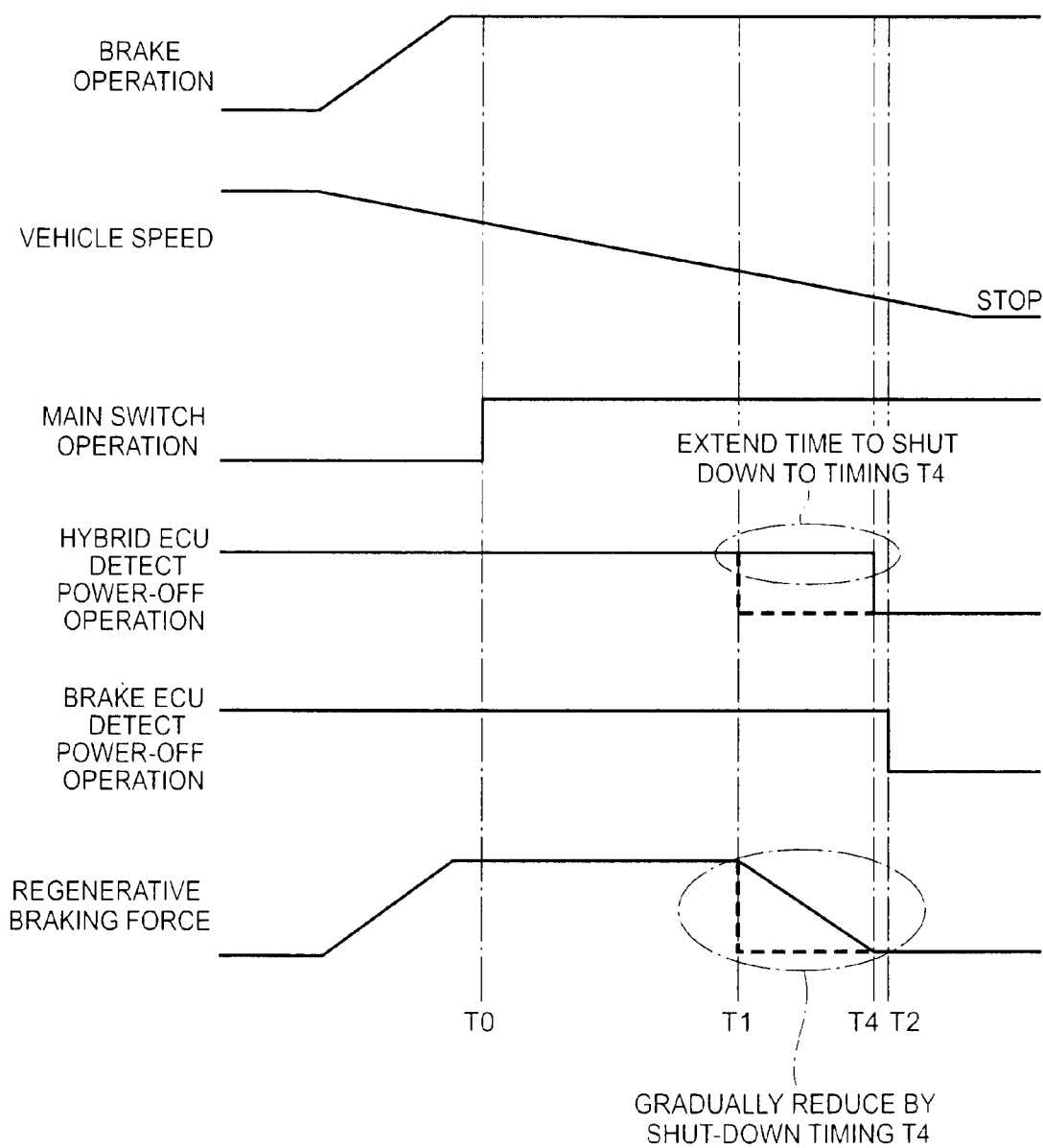

VEHICLE

BACKGROUND OF THE INVENTION

1. Field of the Invention

The invention relates to a vehicle. More specifically, the invention relates to a vehicle including a friction braking device, a generator motor and a control unit that controls the friction braking device and the generator motor.

2. Description of Related Art

For example, there is known a brake control system described in Japanese Patent Application Publication No. 2011-56969 (JP 2011-56969 A). The brake control system includes regenerative braking means for applying a regenerative braking force to wheels by an electric motor and hydraulic braking means for applying a hydraulic braking force to the wheels by pressing friction members against the wheels by the use of hydraulic pressure. In the brake control system, control means determines a target regenerative braking force and a target hydraulic braking force on the basis of a limit value set for the regenerative braking force and a target total braking force, and executes cooperative control over the regenerative braking means and the hydraulic braking means in accordance with these determined target regenerative braking force and target hydraulic braking force. In the thus configured brake control system, when the regenerative braking force is limited by the limit value, the hydraulic braking force is immediately increased in order to achieve the target total braking force.

SUMMARY OF THE INVENTION

Incidentally, in a vehicle including the hydraulic braking means (friction braking device), the electric motor (generator motor) and the control means (control unit) that controls the hydraulic braking means (friction braking device) and the electric motor (generator motor), which constitute the above-described brake control system, that is, for example, a hybrid vehicle, there may occur a situation that a main switch (or an ignition switch) is changed from an on state to an off state while the vehicle is traveling. In this case, the control means of the above-described brake control system preferentially stops the operation of the electric motor by interrupting energization of the electric motor. Thus, when the vehicle in traveling is being braked, the regenerative braking force rapidly reduces because energization of the electric motor is interrupted. Therefore, the above-described brake control system needs to increase the hydraulic braking force (friction braking force) that is generated by the hydraulic braking means in order to keep the target total braking force.

However, when the main switch (ignition) is changed from the on state to the off state while the vehicle is being braked, the control means of the above-described brake control system initially interrupts energization of the electric motor and subsequently increases the hydraulic braking force that is generated by the hydraulic braking means. Therefore, when the control means of the above-described brake control system increases the hydraulic braking force by operating the hydraulic braking means, there occurs a delay time from when the operation of the regenerative braking means is stopped (that is, when the regenerative braking force has rapidly reduced), a response delay of a rise in hydraulic pressure, or the like. Thus, in the vehicle that is being braked by the above-described brake control system, the deceleration steeply fluctuates because of fluctuations in braking force that is applied to the wheels, so an occupant may experience a feeling of strangeness.

The invention provides a vehicle that suppresses steep fluctuations in deceleration during braking.

An aspect of the invention provides a vehicle. The vehicle includes: a friction braking device configured to generate a friction braking force; a generator motor configured to generate a regenerative braking force; and a control unit configured to adjust the friction braking force and adjust the regenerative braking force by controlling energization of the generator motor such that a braking force that is required by the vehicle is generated, interrupt energization of the generator motor at predetermined timing after timing at which a duration of an occupant's specific operation is equal to a threshold time, and control the regenerative braking force such that the regenerative braking force gradually reduces within a specific period from operation detection timing, at which the specific operation has been detected, to the predetermined timing when the regenerative braking force is being generated at the operation detection timing.

The control unit may, for example, gradually reduce the regenerative braking force to a predetermined braking force including zero within the specific period. The predetermined braking force including zero may be set to a regenerative braking force to such an extent that the occupant of the vehicle in braking does not experience a discomfort or an insecurity from decreasing fluctuations in deceleration, resulting from interruption of energization of the generator motor.

In the above aspect, the control unit may be configured to control the friction braking force such that the friction braking force gradually increases within the specific period.

In the above aspect, the control unit may be configured to increase the friction braking force with an amount of reduction in the regenerative braking force such that the braking force that is required by the vehicle is generated within the specific period.

In the above aspect, the specific operation may be an operation of a switch that is used at the time of changing from an energized state where an electrical device mounted on the vehicle is energized to a non-energized state where energization of the electrical device is interrupted, and the control unit may be configured to interrupt energization of the generator motor by at least interrupting an energization path to the generator motor at the predetermined timing.

With this configuration, when the regenerative braking force is being generated at the operation detection timing at which the occupant's operation of the switch (specific operation) has been detected, the control unit is able to interrupt energization of the generator motor by at least interrupting the energization path to the generator motor at the predetermined timing. Specifically, when the vehicle is being braked by generating the regenerative braking force, the occupant is, for example, allowed to conduct an operation to change the switch provided in the energization path to the generator motor (specifically, a main switch, an ignition switch, or the like, provided in an electrical circuit connected to an in-vehicle power supply) from the energized state (on state) to the non-energized state (off state), that is, the specific operation. When the duration of the specific operation of the switch (for example, pressing operation, or the like) becomes equal to the threshold time (for example, press-and-holding operation, repeated pressing operation, or the like), the control unit is able to interrupt energization of the generator motor by interrupting the energization path to the generator motor at the predetermined timing.

Therefore, when the occupant's specific operation of the switch has been detected, the control unit is able to gradually reduce the regenerative braking force within the specific period, more specifically, by the predetermined timing at which the energization path to the generator motor is interrupted. In this case, the control unit is also able to gradually increase the friction braking force within the specific period. Thus, even when there occurs a situation that energization of the generator motor is interrupted in accordance with an occupant's intention, steep fluctuations in the deceleration of the vehicle do not occur, so it is possible to prevent the occupant from experiencing a feeling of strangeness.

When the switch has been operated for a time set in advance so as to be shorter than the threshold time, the control unit is allowed to determine the operation of the switch as the specific operation. Thus, the control unit is able to effectively exclude, for example, detecting an operation shorter than the preset time, such as the influence of noise and an occupant's erroneous operation of the switch, as the specific operation. Thus, it is possible to prevent interruption of energization of the generator motor, which is not intended by the occupant. As a result, it is possible to reduce an opportunity for the occupant to experience a feeling of strangeness, resulting from fluctuations in the deceleration of the vehicle.

In these cases, the control unit may be configured to set a time to interruption of energization of the generator motor such that the time that is taken when the regenerative braking force is being generated at the operation detection timing is longer than the time that is taken when the regenerative braking force is not being generated at the operation detection timing.

In the above aspect, the control unit may be configured to start reducing the regenerative braking force from the operation detection timing or timing after the operation detection timing, the timing being determined on the basis of the operation detection timing. With this configuration, the control unit is able to reliably gradually reduce the regenerative braking force within the specific period. In this case, the control unit is able to gradually increase the friction braking force in synchronization with the timing at which the control unit starts reducing the regenerative braking force. Thus, the control unit is able to synchronize the timing at which the regenerative braking force is gradually reduced with the timing at which the friction braking force is gradually increased. Therefore, it is possible to further effectively suppress fluctuations in the deceleration of the vehicle, so it is possible to prevent the occupant from experiencing a feeling of strangeness.

In the above aspect, the control unit may be configured to change a rate of reduction in the regenerative braking force within the specific period on the basis of a parameter indicating a state associated with braking.

As described above, the control unit is able to change the rate of reduction in the regenerative braking force within the specific period on the basis of the parameter indicating the state associated with braking. As described above, the control unit is able to increase the friction braking force with the amount of reduction in the regenerative braking force such that the braking force that is required by the vehicle is generated within the specific period. With these configurations, the control unit is able to change a rate at the time of substituting the regenerative braking force with the friction braking force as needed within the specific period.

Specifically, for example, when the vehicle quickly brakes, the control unit is able to change the rate of reduction in the regenerative braking force to a high rate by raising the substitution rate such that the friction braking force becomes dominant, and increase the friction braking force (that is, raise the rate of increase in the friction braking force) with the amount of reduction in the regenerative braking force that reduces in accordance with the changed rate of reduction. On the other hand, for example, when the vehicle slowly brakes, the control unit is able to change the rate of reduction in the regenerative braking force to a low rate by decreasing the substitution rate such that the regenerative braking force becomes dominant, and increase the friction braking force (that is, decrease the rate of increase in the friction braking force) with the amount of reduction in the regenerative braking force that reduces in accordance with the changed rate of reduction. Thus, the control unit is able to smoothly carry out the substitution within the specific period. As a result, the deceleration of the vehicle does not fluctuate, so it is possible to further effectively prevent the occupant from experiencing a feeling of strangeness.

In this way, because it is possible to change the substitution rate as needed on the basis of the parameter associated with braking, it is possible to actively exclude a situation that the substitution is required within an extremely short period of time, for example, in the case of executing ABS control. Thus, it is possible to effectively suppress frequent occurrence of the substitution. Conversely, the control unit is able to early reduce the regenerative braking force and increase the friction braking force irrespective of the above-described substitution rate, for example, during ABS control. Thus, it is possible to quickly release lock of the wheels, so it is possible to appropriately brake the vehicle.

According to the above aspect, it is possible to suppress steep fluctuations in the deceleration of the vehicle.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 6 is a time chart that illustrates brake control that is executed by the control device shown in FIG. 1 after the main switch of the hybrid vehicle is operated according to an alternative embodiment to the embodiment of the invention.

DETAILED DESCRIPTION OF EMBODIMENTS

Figure 1:
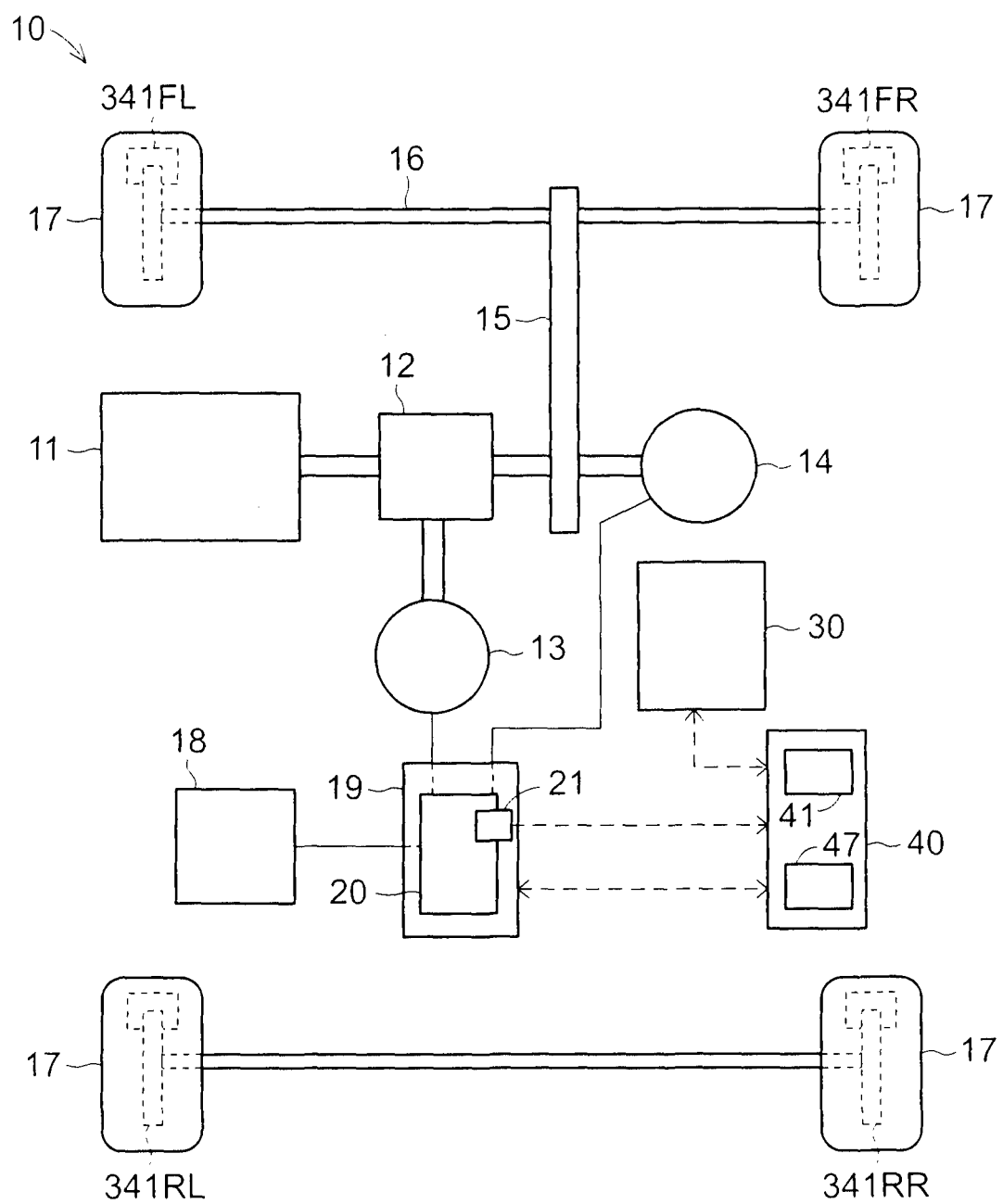
FIG. 1 is a system diagram that shows the schematic configuration of a hybrid vehicle according to an embodiment of the invention.

Hereinafter, a vehicle according to an embodiment of the invention will be described with reference to the accompanying drawings. FIG. 1 is a system diagram that illustrates the schematic configuration of a hybrid vehicle 10, which is the vehicle according to the present embodiment and includes a motor generator and an engine as drive sources. In this hybrid vehicle 10, both a regenerative braking force that is generated by converting kinetic energy to electric energy and a friction braking force that is generated by converting kinetic energy to thermal energy are allowed to be used for braking. Thus, the hybrid vehicle 10 according to the present embodiment is able to execute regenerative brake cooperative control in which a required braking force is generated by the use (cooperation) of these regenerative braking force and friction braking force.

The hybrid vehicle 10 includes not only a hybrid vehicle (HV) including a motor generator and an engine but also a plug-in hybrid vehicle (PHV) that is rechargeable with the use of an external power supply. In the present embodiment, the hybrid vehicle 10 will be described as an example. Of course, the invention may also be implemented by employing an electric vehicle (EV) on which no engine is mounted.

As shown in FIG. 1, the hybrid vehicle 10 includes an engine 11, a power split mechanism 12, motor generators 13, 14, a transmission gear 15, a drive shaft 16 and wheels 17. The motor generators 13, 14 each serve as a generator motor. The hybrid vehicle 10 further includes an electrical storage device 18 and a power converter 19.

The engine 11 outputs a driving force by consuming hydrocarbon fuel (specifically, gasoline, light oil, ethanol, or the like) stored in a fuel tank (not shown) through combustion. In the hybrid vehicle 10, a driving force (kinetic energy) that is output from the engine 11 drives the transmission gear 15 that transmits a driving force to the drive shaft 16 (wheels 17) via the power split mechanism 12.

The power split mechanism 12 is coupled to the engine 11, the motor generator 13 (14) and the transmission gear 15, and distributes power among these elements. A planetary gear unit having three rotary shafts of, for example, a sun gear, a planetary carrier and a ring gear, may be employed as the power split mechanism 12. These rotary shafts are respectively connected to the rotary shafts of the engine 11, motor generator 13 (14) and transmission gear 15.

Each of the motor generators 13, 14 is a three-phase synchronous generator motor that functions as an electric motor when an electric power (electric energy) is supplied from the electrical storage device 18 and that functions as a generator when a driving force is transmitted from the engine 11 or a rotational force (kinetic energy) is transmitted from the wheels 17. Specifically, the motor generator 13 functions as a generator when the driving force (kinetic energy) of the engine 11, split by the power split mechanism 12, is transmitted, and also functions as a motor that can start the engine 11. The motor generator 14 functions as an electric motor (power source) that drives the transmission gear 15 transmitting a driving force to the drive shaft 16 (wheels 17), and also functions to generate a regenerative braking force by converting rotation of the wheels 17, that is, the kinetic energy of the vehicle, to an electric power (electric energy) through regenerative control during braking of the vehicle (described later).

In the present embodiment, the motor generator 13 functions as a generator, and the motor generator 14 functions as an electric motor. Of course, the invention may be implemented such that the motor generator 14 functions as a generator and the motor generator 13 functions as an electric motor, or the invention may be implemented such that the motor generators 13, 14 both function as generators or electric motors.

The electrical storage device 18 is a rechargeable direct-current power supply, and is, for example, formed of a secondary battery, such as a nickel-metal hydride secondary battery and a lithium ion secondary battery. The electrical storage device 18 supplies an electric power to the power converter 19 when the motor generator 14 generates a predetermined driving force. The electrical storage device 18 receives an electric power that is generated by the motor generator 13 and a regenerated electric power resulting from the regenerative braking force generated by the motor generator 14, from the power converter 19 and then stores the electric power. A large-capacitance capacitor may also be employed as the electrical storage device 18. The electrical storage device 18 may be any electric power buffer, that is, a power supply, as long as the electric power buffer is able to temporarily store an electric power generated by the motor generator 13 or the motor generator 14 or an electric power from an eternal power supply and supply the stored electric power to the motor generator 13 or the motor generator 14.

Figure 2:
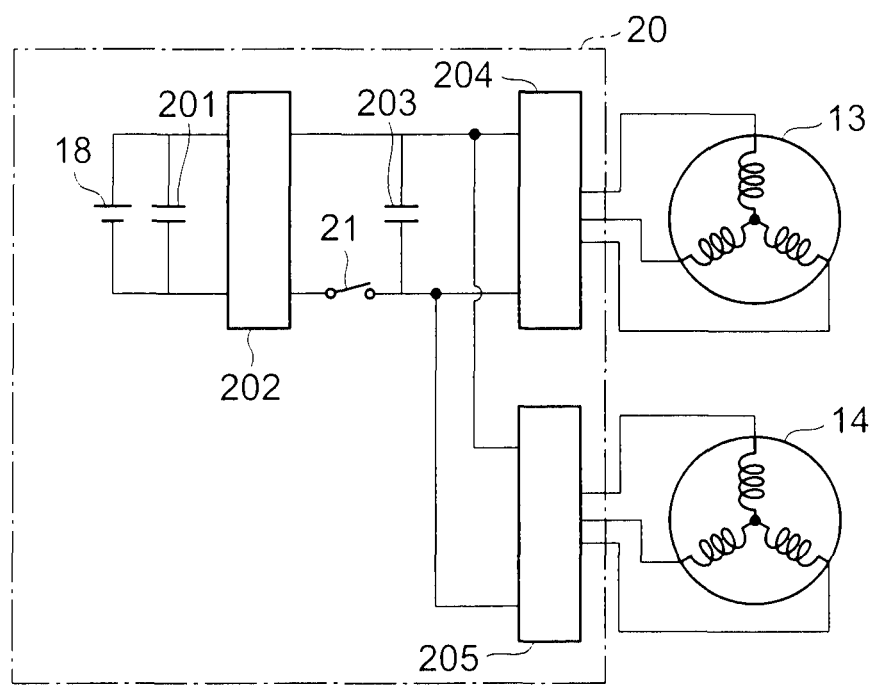
FIG. 2 is a schematic circuit diagram that illustrates a power supply circuit shown in FIG. 1.

The power converter 19 at least constitutes an energization path to the motor generator 14 that is a generator motor, and is configured to include a known power supply circuit 20 as shown in FIG. 1. As shown in FIG. 2, the power supply circuit 20 includes a smoothing capacitor 201 on the electrical storage device 18 side, a voltage converter 202, a step-up-side smoothing capacitor 203, and inverter circuits 204, 205. A main switch 21 is provided in the power supply circuit 20. The main switch 21, for example, serves as a switch that is operated by an occupant, including a driver, in a vehicle cabin and used to change from an energized state to a non-energized state. In the energized state, an electric power is supplied from the electrical storage device 18 to an electrical device. In the non-energized state, supply of an electric power is interrupted. For example, an ignition switch that mainly activates an ignition device of the engine 11 may be employed as the switch.

As shown in FIG. 1, a friction brake device 30 that serves as a friction braking device is mounted on the hybrid vehicle 10. As is specifically shown in FIG. 3, the friction brake device 30 is configured to include a brake operation unit 31, a master cylinder unit 32, a power hydraulic pressure generating unit 33, a brake unit 34 and a hydraulic control valve unit 35. The brake operation unit 31 is formed of a brake pedal 311, a master line 312, a regulator line 313, an accumulator line 314 and a reservoir line 315. The brake pedal 311 is depressed by the driver, which is a brake operation. The master line 312, the regulator line 313, the accumulator line 314 and the reservoir line 315 flow working fluid among the units as will be described later.

The master cylinder unit 32 includes a hydraulic booster 321, a master cylinder 322, a regulator 323, and a reservoir 324. The hydraulic booster 321 is coupled to the brake pedal 311, amplifies a pedal depression force applied to the brake pedal 311, and transmits the amplified pedal depression force to the master cylinder 322. The hydraulic booster 321 is supplied with working fluid from the power hydraulic pressure generating unit 33 via the regulator 323, amplifies a pedal depression force, and transmits the amplified pedal depression force to the master cylinder 322. The master cylinder 322 generates a master cylinder pressure having a predetermined boosting ratio with respect to a pedal depression force.

The reservoir 324 that stores working fluid is provided on the upper side of the master cylinder 322 and the regulator 323. The master cylinder 322 communicates with the reservoir 324 when depression of the brake pedal 311 is released. The regulator 323 communicates with both the reservoir 324 and an accumulator 332 (described later) of the power hydraulic pressure generating unit 33, and generates a hydraulic pressure substantially equal to the master cylinder pressure by using the reservoir 324 as a low-pressure source and using the accumulator 332 as a high-pressure source. In the following description, the hydraulic pressure of the regulator 323 is referred to as regulator pressure. The master cylinder pressure and the regulator pressure do not need to be strictly the same. For example, the regulator pressure may be set so as to be slightly higher than the master cylinder pressure.

The power hydraulic pressure generating unit 33 includes a pump 331 and the accumulator 332. An intake port of the pump 331 is connected to the reservoir 324, a discharge port of the pump 331 is connected to the accumulator 332, and working fluid is pressurized by driving a motor 333. The accumulator 332 converts pressure energy of working fluid pressurized by the pump 331 to pressure energy of encapsulated gas, such as nitrogen, and accumulates the pressure energy. The accumulator 332 is connected to a relief valve 325 provided in the master cylinder unit 32. The relief valve 325 opens when the pressure of working fluid, that is, the hydraulic pressure, becomes higher than or equal to a predetermined pressure, and returns working fluid to the reservoir 324.

Figure 3:
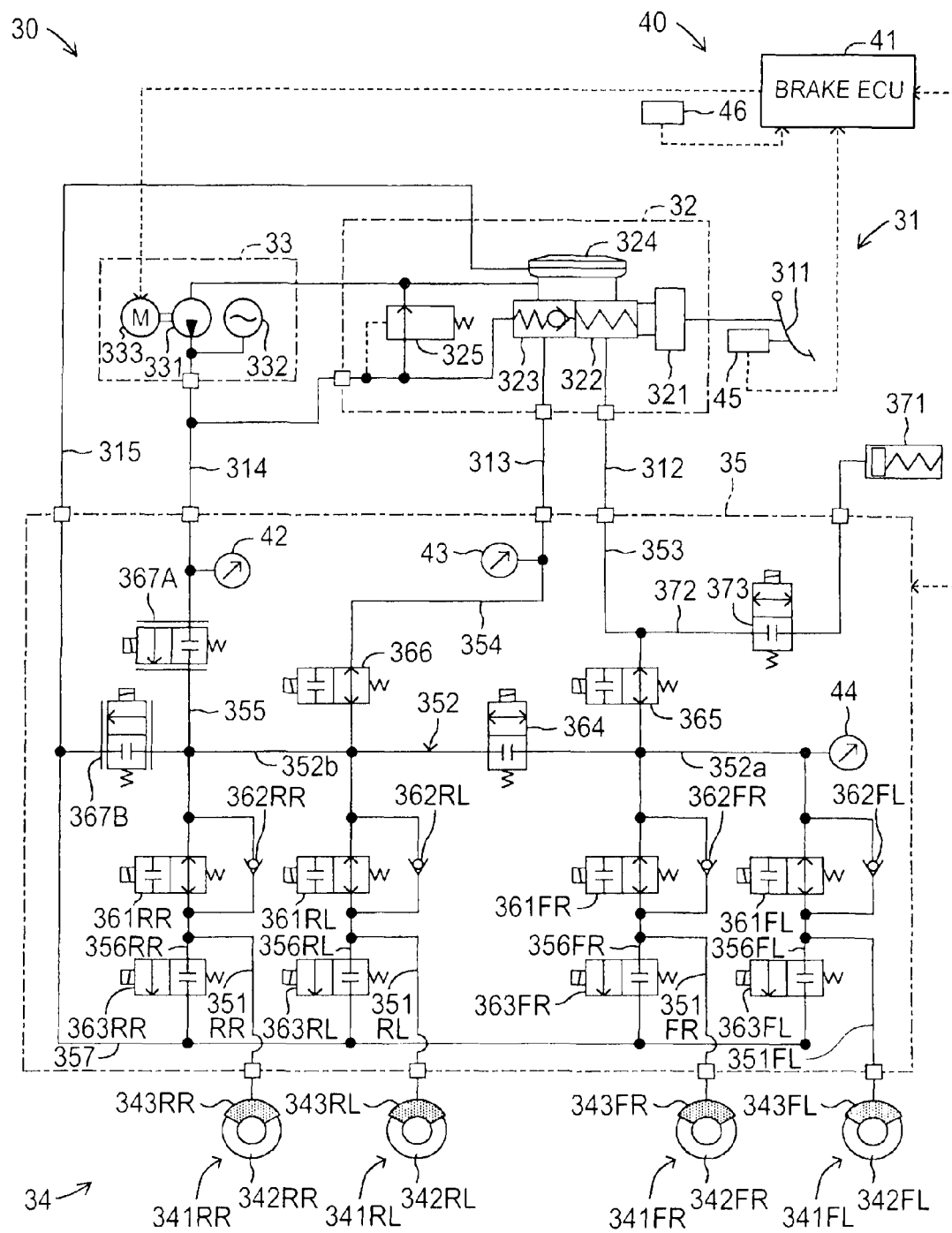
FIG. 3 is a schematic system diagram that mainly shows a hydraulic circuit of a friction brake device shown in FIG. 1.

As shown in FIG. 1 and FIG. 3, the brake unit 34 that generates the friction braking force is formed of disc brake units 341FR, 341FL, 341RR, 341RL respectively provided at the wheels 17. Each of the disc brake units 341FR, 341FL, 341RR, 341RL includes a corresponding one of brake rotors 342FR, 342FL, 342RR, 342RL and a corresponding one of wheel cylinders. 343FR, 343FL, 343RR, 343RL, incorporated in a corresponding one of brake calipers. The brake unit 34 is not limited to a configuration that all the four wheels are of a disc brake type. For example, all the four wheels may be of a drum brake type or a selected combination, such as a combination that the front wheels are of a disc brake type and the rear wheels are of a drum brake type, is also applicable. In the following description, for the configuration provided at each wheel 17, FR is suffixed to the reference numerals for the front right wheel, FL is suffixed to the reference numerals for the front left wheel, RR is suffixed to the reference numerals for the rear right wheel, and RL is suffixed to the reference numerals for the rear left wheel; however, those suffixes are omitted if the wheel positions do not need to be particularly specified.

The wheel cylinders 343FR, 343FL, 343RR, 343RL are connected to the hydraulic control valve unit 35, and the hydraulic pressure of working fluid that is supplied from the hydraulic control valve unit 35 is transmitted to the wheel cylinders 343FR, 343FL, 343RR, 343RL. Brake pads that are friction members are pressed against each of the brake rotors 342FR, 342FL, 342RR, 342RL that rotate together with the corresponding wheels 17 by the hydraulic pressure that is supplied from the hydraulic control valve unit 35, and a friction braking force is generated by converting the kinetic energy of the hybrid vehicle 10, to thermal energy.

In this way the friction brake device 30 includes the master cylinder 322, the regulator 323 and the power hydraulic pressure generating unit 33 as a hydraulic pressure source that applies the hydraulic pressure of working fluid to the wheel cylinders 343. The master cylinder 322 and the regulator 323 utilize a driver's brake depression force (a force depressing the brake pedal 311). The power hydraulic pressure generating unit 33 applies a hydraulic pressure irrespective of the driver's brake depression force. The master cylinder 322, the regulator 323 and the power hydraulic pressure generating unit 33 are connected to the hydraulic control valve unit 35 via the corresponding master line 312, regulator line 313 and accumulator line 314. The reservoir 324 is connected to the hydraulic control valve unit 35 via the reservoir line 315.

As shown in FIG. 3, the hydraulic control valve unit 35 includes four individual flow passages 351FR, 351FL, 351RR, 351RL, a main flow passage 352, a master flow passage 353, a regulator flow passage 354 and an accumulator flow passage 355. The individual flow passages 351FR, 351FL, 351RR, 351RL are respectively connected to the wheel cylinders 343FR, 343FL, 343RR, 343RL. The main flow passage 352 communicates the individual flow passages 351FR, 351FL, 351RR, 351RL with one another. The master flow passage 353 connects the main flow passage 352 to the master line 312. The regulator flow passage 354 connects the main flow passage 352 to the regulator line 313. The accumulator flow passage 355 connects the main flow passage 352 to the accumulator line 314. The master flow passage 353, the regulator flow passage 354 and the accumulator flow passage 355 are connected to the main flow passage 352 in parallel with one another.

ABS holding valves 361FR, 361FL, 361RR, 361RL are respectively provided in the middle portions of the individual flow passages 351FR, 351FL, 351RR, 351RL. Each of the ABS holding valves 361 is a normally open electromagnetic on-off valve that keeps its open state by the use of the urging force of a spring when a solenoid is not energized and that becomes its closed state only when the solenoid is energized. Each of the ABS holding valves 361 is able to bidirectionally flow working fluid in the open state, and has no directivity.

Return check valves 362FR, 362FL, 362RR, 362RL are respectively provided in the individual flow passages 351FR, 351FL, 351RR, 351RL in parallel with the ABS holding valves 361FR, 361FL, 361RR, 361RL. Each of the return check valves 362 is a valve that interrupts flow of working fluid from the main flow passage 352 to a corresponding one of the wheel cylinders 343, and that allows flow of working fluid from a corresponding one of the wheel cylinders 343 toward the main flow passage 352. That is, a valve element mechanically opens to flow working fluid in a corresponding one of the wheel cylinders 343 toward the main flow passage 352 when the hydraulic pressure of the corresponding one of the wheel cylinders 343 (hereinafter, referred to as wheel cylinder pressure) is higher than the hydraulic pressure in the main flow passage 353; whereas the valve element closes when the wheel cylinder pressure is lower than or equal to the hydraulic pressure in the main flow passage 352. Thus, while the ABS holding valves 361 are closed and the wheel cylinder pressures are held, when a control pressure in the main flow passage 352 decreases and becomes lower than the wheel cylinder pressures, it is possible to decrease the wheel cylinder pressures to the control pressure in the main flow passage 352 while the ABS holding valves 361 are kept closed.

Pressure reducing individual flow passages 356FR, 356FL, 356RR, 356RL are respectively connected to the individual flow passages 351FR, 351FL, 351RR, 351RL. The pressure reducing individual flow passages 356 are connected to a reservoir flow passage 357. The reservoir flow passage 357 is connected to the reservoir 324 via the reservoir line 315. ABS pressure reducing valves 363FR, 363FL, 363RR, 363RL are respectively provided in the middle portions of the pressure reducing individual flow passages 356FR, 356FL, 356RR, 356RL. Each of the ABS pressure reducing valves 363 is a normally closed electromagnetic on-off valve that keeps its closed state by the use of the urging force of a spring when a solenoid is not energized and that becomes its open state only when the solenoid is energized. Each of the ABS pressure reducing valves 363 reduces a corresponding one of the wheel cylinder pressures by flowing working fluid from a corresponding one of the wheel cylinders 343 to the reservoir flow passage 357 via a corresponding one of the pressure reducing individual flow passages 356 in the open state.

Each ABS holding valve 361 and each ABS pressure reducing valve 363 undergo open/close control, for example, when anti-lock brake control is activated in the case where the corresponding wheel 17 tends to lock (that is, the corresponding wheel 17 tends to slip). In anti-lock brake control, lock of the wheel 17 is prevented by reducing a corresponding one of the wheel cylinder pressures.

A communication valve 364 is provided in the middle portion of the main flow passage 352. The communication valve 364 is a normally closed electromagnetic on-off valve that keeps its closed state by the use of the urging force of a spring when a solenoid is not energized and that becomes its open state only when the solenoid is energized. The main flow passage 352 is divided into a first main flow passage 352a and a second main flow passage 352b. The first main flow passage 352a is a one-side portion of the main flow passage 352 with respect to the communication valve 364, and is connected to the master flow passage 353. The second main flow passage 352b is the other-side portion of the main flow passage 352 with respect to the communication valve 364, and is connected to the regulator flow passage 354 and the accumulator flow passage 355. When the communication valve 364 is in the closed state, flow of working fluid is interrupted between the first main flow passage 352a and the second main flow passage 352b. When the communication valve 364 is in the open state, flow of working fluid is bidirectionally allowed between the first main flow passage 352a and the second main flow passage 352b.

A master cut valve 365 is provided in the middle portion of the master flow passage 353. The master cut valve 365 is a normally open electromagnetic on-off valve that keeps its open state by the use of the urging force of a spring when a solenoid is not energized and that becomes its closed state only when the solenoid is energized. When the master cut valve 365 is in the closed state, flow of working fluid is interrupted between the master cylinder 322 and the first main flow passage 352a. When the master cut valve 365 is open, flow of working fluid is bidirectionally allowed between the master cylinder 322 and the first main flow passage 352a.

A stroke simulator 371 is provided in the master flow passage 353 on the master cylinder 322 side with respect to a location at which the master cut valve 365 is provided. The stroke simulator 371 allows driver's stroke operation of the brake pedal 311, and provides driver's high brake operation feeling by generating reaction force based on a pedal operation amount. Therefore, the stroke simulator 371 is connected via a simulator flow passage 372 and a simulator cut valve 373. The simulator flow passage 372 is branched off from the master flow passage 353. The simulator cut valve 373 is a normally closed electromagnetic on-off valve that is provided in the simulator flow passage 372.

A regulator cut valve 366 is provided in the middle portion of the regulator flow passage 354. The regulator cut valve 366 is a normally open electromagnetic on-off valve that keeps its open state by the use of the urging force of a spring when a solenoid is not energized and that becomes its closed state only when the solenoid is energized. When the regulator cut valve 366 is in the closed state, flow of working fluid is interrupted between the regulator 323 and the second main flow passage 352b. When the regulator cut valve 366 is in the open state; flow of working fluid is bidirectionally allowed between the regulator 323 and the second main flow passage 352b.

A pressure intensifying linear control valve 367A is provided in the middle portion of the accumulator flow passage 355. The second main flow passage 352b, to which the accumulator flow passage 355 is connected, is connected to the reservoir flow passage 357 via a pressure reducing linear control valve 367B. Each of the pressure intensifying linear control valve 367A and the pressure reducing linear control valve 367B is a normally closed electromagnetic on-off valve that keeps its closed state by the use of the urging force of a spring when a solenoid is not energized and that increases its opening degree in accordance with an increase in the amount of energization (the value of current) to the solenoid. Each of the pressure intensifying linear control valve 367A and the pressure reducing linear control valve 367B keeps its closed state by the use of a valve closing force that is a difference between a spring force that the spring urges the valve element in the valve closing direction and a differential pressure force that the valve element is urged in the valve opening direction by a differential pressure between a primary side (inlet side) in which relatively high-pressure working fluid flows and a secondary side (outlet side) in which relatively low-pressure working fluid flows.

On the other hand, each of the pressure intensifying linear control valve 367A and the pressure reducing linear control valve 367B opens at the opening degree based on the balance of forces that act on the valve element when an electromagnetic attraction force that is generated by energization of the solenoid and that acts in the direction in which the valve element is opened exceeds the valve closing force, that is, when the relationship Electromagnetic attraction force>Valve closing force (=Spring force−Differential pressure force) is satisfied. Thus, each of the pressure intensifying linear control valve 367A and the pressure reducing linear control valve 367B is able to adjust the opening degree based on the differential pressure force, that is, the differential pressure between the primary side (inlet side) and the secondary side (outlet side) by controlling the amount of energization (the value of current) to the solenoid. In the following description, when the pressure intensifying linear control valve 367A and the pressure reducing linear control valve 367B do not need to be distinguished from each other, these are simply referred to as the linear control valves 367.

As shown in FIG. 1, a control device 40 that serves as a control unit is mounted on the hybrid vehicle 10. As shown in FIG. 1, the control device 40 is configured to include a brake ECU 41. The brake ECU 41 includes a microcomputer, formed of a CPU, a ROM, a RAM, a timer, and the like, as a major component, and includes a drive circuit, an interface, a communication interface, and the like. The drive circuit drives the friction brake device 30. Various sensor signals are input to the interface. The control device 40 is connected to the power converter 19 (the power supply circuit 20 and the main switch 21) via the communication interface. The power converter 19 is mounted on the hybrid vehicle 10. Thus, the brake ECU 41 according to the present embodiment also directly controls the regenerative braking force by the motor generator 14 via the power converter 19 (the power supply circuit 20).

The brake ECU 41 is connected to the electromagnetic on-off valves and linear control valves provided in the friction brake device 30 mounted on the hybrid vehicle 10 via a drive circuit, controls the open/closed states and opening degrees by outputting solenoid driving signals, and causes the friction brake device 30 to exercise the friction braking force by controlling the wheel cylinder pressures in the respective wheel cylinders 343. The motor 333 provided in the power hydraulic pressure generating unit 33 is also connected to the brake ECU 41 via a drive circuit, and is controlled and driven by a motor driving signal that is output from the brake ECU 41.

As shown in FIG. 3, the control device 40 includes an accumulator pressure sensor 42, a regulator pressure sensor 43 and a control pressure sensor 44. The accumulator pressure sensor 42 detects an accumulator pressure Pacc that is the pressure of working fluid (hydraulic pressure) in the accumulator flow passage 355 on the power hydraulic pressure generating unit 33 side (upstream side) with respect to the pressure intensifying linear control valve 367A. The accumulator pressure sensor 42 outputs a signal indicating the detected accumulator pressure Pacc to the brake ECU 41. Thus, the brake ECU 41 loads the accumulator pressure Pacc at predetermined intervals, pressurizes working fluid with the pump 331 by driving the motor 333 when the accumulator pressure Pacc becomes lower than a preset minimum setting pressure, and controls the accumulator pressure Pacc such that the accumulator pressure Pacc is constantly kept within a setting pressure range.

The regulator pressure sensor 43 detects a regulator pressure Preg that is the pressure of working fluid in the regulator flow passage 354 on the regulator 323 side (upstream side) with respect to the regulator cut valve 366. The regulator pressure sensor 43 outputs a signal indicating the detected regulator pressure Preg to the brake ECU 41. The control pressure sensor 44 outputs a signal indicating a control pressure Px to the brake ECU 41. The control pressure Px is the pressure of working fluid in the first main flow passage 352a.

As shown in FIG. 3, a pedal stroke sensor 45 provided at the brake pedal 311 is connected to the brake ECU 41. The pedal stroke sensor 45 detects a pedal stroke Sp that is the depression amount (operation amount) of the brake pedal 311 in driver's brake operation. The pedal stroke sensor 45 outputs a signal indicating the detected pedal stroke Sp to the brake ECU 41. A wheel speed sensor 46 is connected to the brake ECU 41. The wheel speed sensor 46 detects a vehicle speed V of the hybrid vehicle 10. The wheel speed sensor 46 detects a wheel speed that is the rotation speed of each of the right, left, front and rear wheels, and outputs a signal indicating the detected wheel speed Vx to the brake ECU 41.

As shown in FIG. 1, the control device 40 that serves as the control unit is configured to include a hybrid ECU 47. The hybrid ECU 47 also includes a microcomputer, formed of a CPU, a ROM, a RAM, and the like, as a major component. As will be described later, the hybrid ECU 47 controls the hybrid vehicle 10 overall by, for example, interrupting the power converter 19 (the power supply circuit 20). Detailed control over the hybrid vehicle 10 by the hybrid ECU 47 and the operation of the hybrid ECU 47 in association with the control are not directly relevant to the invention, so the description is omitted.

Next, the control device 40 according to the present embodiment, more specifically, regenerative brake cooperative control that is executed by the brake ECU 41 and the hybrid ECU 47, will be described. The brake ECU 41 executes regenerative brake cooperative control (hereinafter, also simply referred to as cooperative control) for causing the regenerative braking force and the friction braking force to cooperate with each other. The regenerative braking force is generated when the motor generator 14 controls regeneration (energization). The friction braking force is generated when the friction brake device 30 adjusts the hydraulic pressure of each wheel cylinder 343.

In cooperative control, the brake ECU 41 keeps the master cut valve 365 and regulator cut valve 366 of the friction brake device 30 in the closed state by energizing the corresponding solenoids, and keeps the communication valve 364 in the open state by energizing the corresponding solenoid. The brake ECU 41 keeps the simulator cut valve 373 in the open state by energizing the solenoid. The brake ECU 41 controls the pressure intensifying linear control valve 367A and the pressure reducing linear control valve 367B to opening degrees based on the amounts of energization of the corresponding solenoids through energization control. During normal times, the brake ECU 41 keeps the ABS holding valves 361 in the open state, and keeps the ABS pressure reducing valves 363 in the closed state. The brake ECU 41, where necessary, controls the open/closed states of the ABS holding valves 361 and ABS pressure reducing valves 363 in accordance with known anti-lock brake control, or the like.

Here, in cooperative control, the master cut valve 365 and the regulator cut valve 366 both are kept in the closed state, so the hydraulic pressure that is output from the master cylinder unit 32 is not transmitted to the wheel cylinders 343. In cooperative control, the communication valve 364 is kept in the open state, and the pressure intensifying linear control valve 367A and the pressure reducing linear control valve 367B are placed in an energization control state. Therefore, the hydraulic pressure (that is, the accumulator pressure) that is output from the power hydraulic pressure generating unit 33 is regulated by the pressure intensifying linear control valve 367A and the pressure reducing linear control valve 367B, and is transmitted to the four wheel cylinders 343. In this case, the wheel cylinders 343 communicate with one another via the main flow passage 352, so all the wheel cylinder pressures have the same value among the four wheels. This wheel cylinder pressure is allowed to be detected by the control pressure sensor 44.

Upon reception of a braking request, the brake ECU 41 applies a braking force to the wheels 17 by causing the regenerative braking force that is generated by the motor generator 14 of the hybrid vehicle 10 and the friction braking force that is generated by the friction brake device 30 to cooperate with each other, thus controlling braking of the hybrid vehicle 10. The braking request is, for example, issued when a braking force should be applied to the vehicle, such as when a brake operation is conducted by the driver. Upon reception of a braking request, the brake ECU 41 acquires the pedal stroke Sp of the brake pedal 311, which is detected by the pedal stroke sensor 45 as a result of driver's brake operation, as a parameter indicating a state associated with braking, and computes a target braking force on the basis of the pedal stroke Sp. The target braking force is set to a larger value as the pedal stroke Sp increases, and is achieved by combining the regenerative braking force and the friction braking force with each other. Instead of using the pedal stroke Sp that is detected by the pedal stroke sensor 45 as a result of driver's brake operation, it is also allowed to detect the regulator pressure Preg that is detected by the regulator pressure sensor 43 as a result of brake operation as the parameter indicating the state associated with braking. Other than that, it is also allowed to detect a depression force as the parameter indicating the state associated with braking by providing a depression force sensor that detects the depression force of the brake pedal 311 as a result of brake operation.

The brake ECU 41 according to the present embodiment transmits information indicating the computed target braking force to the hybrid ECU 47. The hybrid ECU 47 computes a braking force that is generated by controlling energization of the motor generator 14, more specifically, regeneration of electric power, within the target braking force, and transmits information indicating the regenerative braking force that is the computed result to the brake ECU 41. Thus, the brake ECU 41 computes a target friction braking force by subtracting the regenerative braking force from the target braking force. The target friction braking force is a friction braking force that should be generated by the friction brake device 30. The regenerative braking force that is generated by regenerating electric power (through energization control) in cooperative control varies with not only the rotation speed of the motor generator 14 but also the state of charge (SOC) of the electrical storage device 18, or the like. Thus, by subtracting the regenerative braking force from the target braking force that is determined in correspondence with driver's brake operation, it is possible to compute the appropriate target friction braking force.

The brake ECU 41 controls energization of the motor generator 14 in cooperation with the hybrid ECU 47 or directly controls energization via the power converter 19 that is the energization path in order to generate the above-described regenerative braking force. On, the other hand, the brake ECU 41 computes a target hydraulic pressure of each wheel cylinder 343, corresponding to the target friction braking force, on the basis of the computed target friction braking force. The brake ECU 41 controls the amount of energization of the pressure intensifying linear control valve 367A and the amount of energization of the pressure reducing linear control valve 367B through feedback control such that the wheel cylinder pressure is equal to the computed target hydraulic pressure. That is, the brake ECU 41 controls the amounts of energization of the solenoids of the pressure intensifying linear control valve 367A and pressure reducing linear control valve 367B such that the control pressure Px (=the wheel cylinder pressure) detected by the control pressure sensor 44 follows the target hydraulic pressure. Thus, working fluid is supplied from the power hydraulic pressure generating unit 33 to the wheel cylinders 343 via the pressure intensifying linear control valve 367A, and the friction braking force is applied to the wheels 17. Thus, during normal times, the brake ECU 41 is able to apply the braking force, corresponding to driver's brake operation, to the wheels 17 through cooperative control, and is able to appropriately brake the hybrid vehicle 10.

Incidentally, the occupant including the driver is allowed to operate the main switch 21 in the hybrid vehicle 10 in traveling in order to change from an energized state where a plurality of electrical devices mounted on the vehicle 10 are energized from the electrical storage device 18 to a non-energized state where energization is interrupted, that is, in order to interrupt (shut down) the power supply circuit 20 of the power converter 19. Specifically, in the hybrid vehicle 10 in traveling, the occupant is allowed to, for example, conduct an operation to press down an operation button of the main switch 21 and then hold the pressed state for a threshold time, that is, so-called press-and-holding operation, as a specific operation of the main switch 21. Alternatively, the occupant is allowed to conduct an operation to press the operation button of the main switch 21 a predetermined number of times within a threshold time, that is, so-called repeated pressing operation, as the specific operation of the main switch 21. In the following description, the press-and-holding operation or repeated pressing operation, conducted by the driver on the operation button of the main switch 21, in order to shut down the power supply circuit 20 that is in order to interrupt the energization path is collectively referred to as power-off operation.

In the hybrid vehicle 10 according to the related art, when the power-off operation is conducted, the hybrid ECU 47 shuts down the power supply circuit 20 of the power converter 19 to preferentially stop the operations of the motor generators 13, 14. Therefore, in the hybrid vehicle 10 according to the related art, when the power-off operation is conducted while the driver is conducting brake operation by depressing the brake pedal 311, the regenerative braking force initially rapidly reduces as a result of interruption of energization of the motor generator 14, and then the friction braking force that is generated by the friction brake device 30 increases. As a result, the braking force that is applied to the wheels 17 may temporarily fluctuate to reduce. Thus, the driver (occupant) may sense steep fluctuations in the deceleration of the hybrid vehicle 10 and experience an uncomfortable feeling of strangeness. This will be specifically described below with reference to FIG. 4.

As described above, when the driver conducts brake operation in the hybrid vehicle 10 according to the related art, the brake ECU. 41, for example, preferentially causes the motor generator 14 to generate the regenerative braking force in accordance with cooperative control in cooperation with the hybrid ECU 47, and causes the friction brake device 30 to generate the friction braking force. Thus, in the hybrid vehicle 10 according to the related art, as shown in FIG. 4, when the driver conducts brake operation by depressing the brake pedal 311, the regenerative braking force is initially preferentially applied to the wheels 17, and the vehicle speed uniformly decreases.

Figure 4:
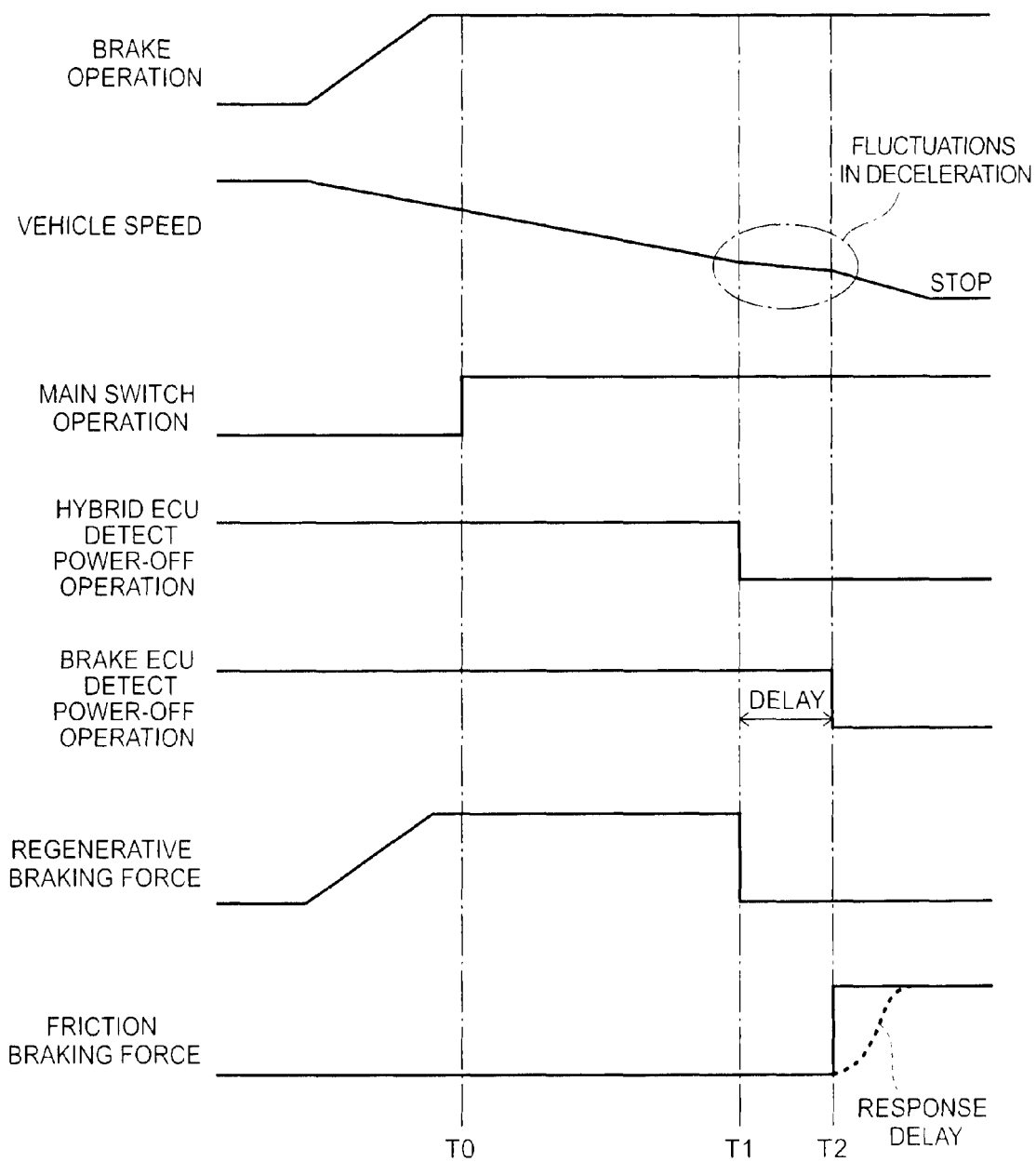
FIG. 4 is a time chart that illustrates ordinary brake control after a main switch of a hybrid vehicle is operated according to the related art.

In this way, while the hybrid vehicle 10 is being braked by preferentially applying the regenerative braking force to the wheels 17 in accordance with cooperative control, when the driver conducts the power-off operation of the main switch 21 from timing T0, the hybrid ECU 47 and the brake ECU 41 detect the driver's power-off operation of the main switch 21 as shown in FIG. 4. For the timing at which the driver's power-off operation of the main switch 21 is detected, the hybrid ECU 47 detects (determines) the power-off operation at earlier timing than the brake ECU 41. That is, as shown in FIG. 4, the hybrid ECU 47 detects (determines) the power-off operation of the main switch 21 at timing T1, and the brake ECU 41 detects (determines) the power-off operation of the main switch 21 at timing T2 later than the timing T1.

More specifically, when the driver conducts the power-off operation of the main switch 21 while braking the hybrid vehicle 10 according to the related art, the hybrid ECU 47 initially detects (determines) the power-off operation ahead at the timing T1 as shown in FIG. 4. Thus, the hybrid ECU 47 shuts down the power supply circuit 20 of the power converter 19, and interrupts energization of the motor generators 13, 14, thus stopping the operations of the motor generators 13, 14. With the stop of the operation of the motor generator 14, the regenerative braking force rapidly reduces to zero as shown in FIG. 4. Subsequently, as shown in FIG. 4, the brake ECU 41 detects (determines) the power-off operation at the timing T2. Thus, the brake ECU 41 operates the friction brake device 30 at the timing T2 later than the timing T1. With the start of the operation of the friction brake device 30, the friction braking force increases as shown in FIG. 4.

Therefore, in the hybrid vehicle 10 according to the related art, as shown in FIG. 4, the state where the braking force that is applied to the wheels 17 temporarily reduces occurs from the timing T1 at which the hybrid ECU 47 shuts down the power supply circuit 20 and the regenerative braking force that is generated by the motor generator 14 becomes zero to the timing T2 at which the brake ECU 41 increases the friction braking force by operating the friction brake device 30. As indicated by the dashed line in the friction braking force in FIG. 4, when the brake ECU 41 increases the friction braking force that is generated by the friction brake device 30, there occurs a response delay in intensifying the wheel cylinder pressure (hydraulic pressure). Therefore, the friction braking force has not sufficiently increased at the timing passing by the timing T2, and there occurs the state where the braking force that is applied to the wheels 17 is reduced. As a result, the occupant senses fluctuations in deceleration, resulting from a temporary reduction in the braking force (see the timing T1 to the timing T2 in the vehicle speed surrounded by the alternate long and short dashed line in FIG. 4) and experiences an uncomfortable feeling of strangeness.

Figure 5:
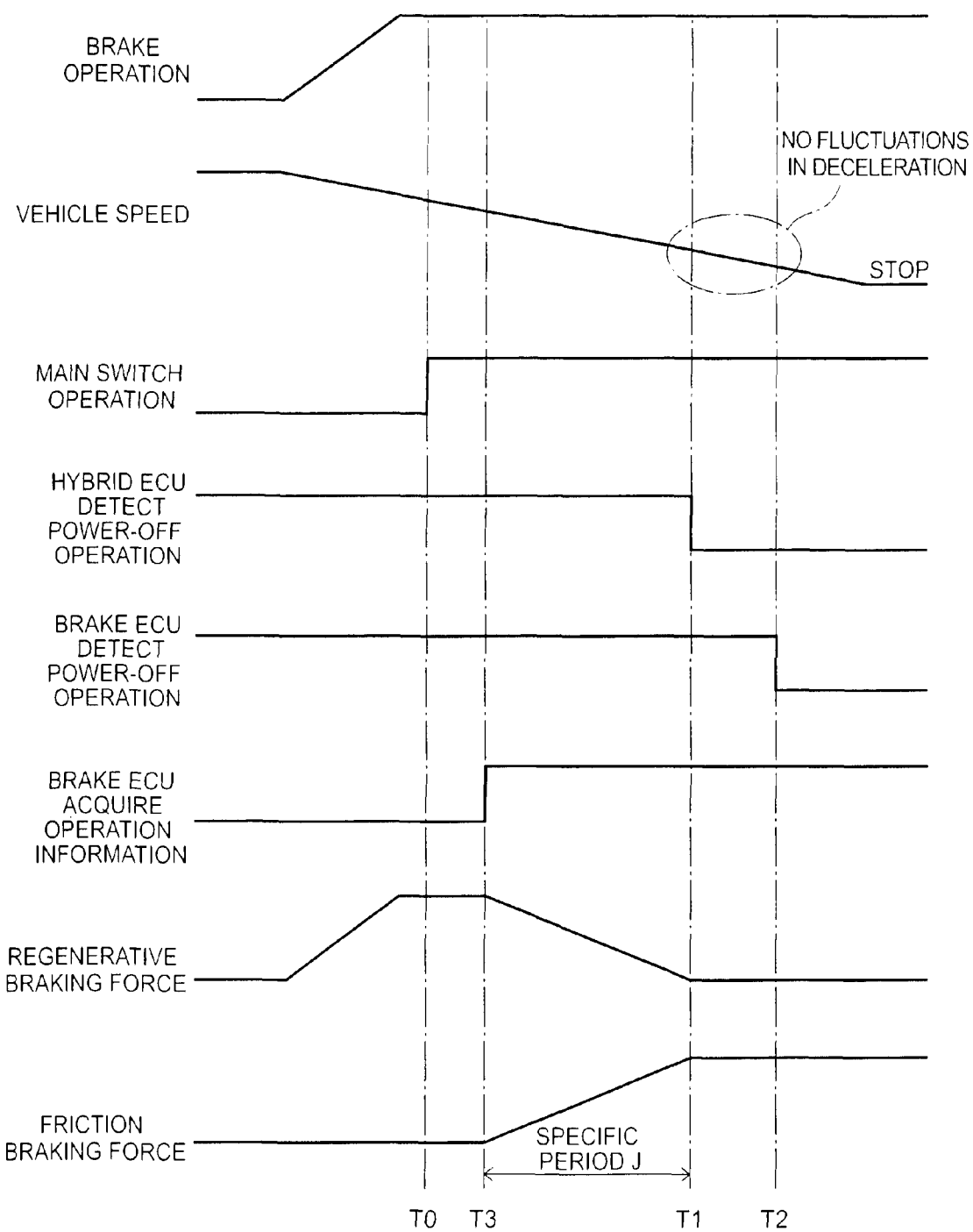
FIG. 5 is a time chart that illustrates brake control that is executed by a control device shown in FIG. 1 after the main switch of the hybrid vehicle is operated according to the embodiment of the invention.

Therefore, while the hybrid vehicle 10 according to the present embodiment is braking by generating the regenerative braking force, when the occupant conducts the specific operation, that is, pressing the operation button of the main switch 21, the brake ECU 41 acquires operation information indicated by the signal that is output from the main switch 21 as a result of the pressing operation of the operation button as shown in FIG. 5. Specifically, as shown in FIG. 5, the brake ECU 41 acquires the operation information in accordance with the power-off operation at timing T3 before the timing t1 (hereinafter, referred to as predetermined timing T1) at which the hybrid ECU 47 detects (determines) the power-off operation and actually interrupts energization of the motor generator 14. Thus, the brake ECU 41 detects the occupant's specific operation of the main switch 21 at the timing T3, so the timing T3 becomes operation detection timing T3. The brake ECU 41 acquires the operation information (signal) output from the main switch 21 at its own control intervals, so the operation detection timing T3 is later than the timing T0.

In this way, the brake ECU 41 early acquires the operation information from the main switch 21 at the operation detection timing T3. Thus, the brake ECU 41 is able to determine in advance that the power-off operation of the main switch 21 is conducted and there is a high possibility that the hybrid ECU 47 shuts down the power supply circuit 20 at the predetermined timing T1 in the future. Thus, in the hybrid vehicle 10 according to the present embodiment, the brake ECU 41 is able to gradually reduce the regenerative braking force that is generated by the motor generator 14 and gradually increase the friction braking force that is generated by the friction brake device 30 by the predetermined timing T1 at which the power supply circuit 20 is actually shut down by the hybrid ECU 47. Hereinafter, reducing the regenerative braking force and increasing the friction braking force by the brake ECU 41 according to the present embodiment will be specifically described with reference to FIG. 5.

The brake ECU 41 according to the present embodiment acquires the signal indicating the operation information from the main switch 21. In this case, the brake ECU 41 determines whether the signal is continuously acquired from the main switch 21 over a time (for example, several tens of milliseconds) set so as to be shorter than a threshold time (for example, from several hundreds of milliseconds to several seconds) in which the occupant continues operating the operation button in order to satisfy the power-off operation. The brake ECU 41 determines that the occupant is intentionally conducting the specific operation of the operation button of the main switch 21 when continuously acquiring the signal, and acquires the operation information indicated by the continuous signal as proper operation information. Thus, the brake ECU 41 is able to effectively exclude a signal resulting from, for example, the influence of noise or erroneous operation (pressing operation) of the main switch 21 not intended by the occupant, that is, erroneous operation information.

As shown in FIG. 5, the brake ECU 41 acquires the operation information, output after the driver has conducted the specific operation of the main switch 21, at the operation detection timing T3. Thus, the brake ECU 47 gradually reduces the regenerative braking force that is generated by the motor generator 14 from the above-described target braking force to a predetermined value within the period from the operation detection timing T3 to the predetermined timing T1 at which the power-off operation is detected by the hybrid ECU 47 and the power supply circuit 20 is shut down. The predetermined value is, for example, set to a braking force to such an extent that the occupant does not experience a feeling of strangeness even when the power supply circuit 20 is shut down and the regenerative braking force rapidly reduces as a result of interruption of energization of the motor generator 14. Thus, in the present embodiment, as shown in FIG. 5, the brake ECU 47 reduces the regenerative braking force to zero within the period from the operation detection timing T3 to the predetermined timing T1.

This will be specifically described with reference to FIG. 5. The brake ECU 41 applies the regenerative braking force, which coincides with the target braking force, to the wheels 17 in accordance with cooperative control until the operation detection timing T3. The brake ECU 41 preferentially applies the regenerative braking force that is generated by the motor generator 14 to the wheels 17 in order to efficiently recover a regenerative electric power (in order to store an electric power in the electrical storage device 18). In this way, in a situation that the vehicle speed is decreased by braking the hybrid vehicle 10 through application of the regenerative braking force to the wheels 17, when the occupant conducts the specific operation by pressing the operation button of the main switch 21 at the timing T0, the brake ECU 41 acquires the operation information (signal) and detects the specific operation at the operation detection timing T3 as shown in FIG. 5. The brake ECU 41 gradually reduces the regenerative braking force from the target braking force to zero that is the predetermined value within the period from the operation detection timing T3 at which the operation information is acquired to the predetermined timing T1 at which energization of the motor generator 14 is interrupted and the regenerative braking force is not applied.

In this case, the brake ECU 41 controls the operation of the inverter circuit 205, and the like, that constitute the power supply circuit 20 of the power converter 19 that is the energization path, for example, in cooperation with the hybrid ECU 47 or alone more directly. Thus, for example, the hybrid ECU 47 gradually reduces the electric power that is supplied to the motor generator 14, and reduces the regenerative braking force to zero by the predetermined timing T1 at which the power supply circuit 20 is shut down. Therefore, even when the power supply circuit 20 is shut down by the hybrid ECU 47 and energization of the motor generator 14 is interrupted, a rapid reduction in the regenerative braking force does not occur. Thus, the occupant does not sense fluctuations in deceleration, resulting from a reduction in the braking force, so it is possible to prevent the occupant from experiencing a discomfort or an insecurity.

The period from the operation detection timing T3 to the predetermined timing T1 at which energization of the motor generator 14 is interrupted is referred to as specific period J. In the specific period J, the brake ECU 41 is able to change the rate of reduction in the regenerative braking force on the basis of, for example, the pedal stroke Sp that is the parameter indicating the state associated with braking, that is, on the basis of the state of the hybrid vehicle 10 that is braking, for example, quickly braking or slowly braking. In the specific period J, for the range in which the rate of reduction in the regenerative braking force is changed, it is desirable to exclude the range of an extremely high rate of reduction in order to exclude a situation that, for example, braking is carried out while the behavior of the hybrid vehicle 10 is stabilized by reducing the regenerative braking force in an extremely short period of time, such as during ABS control and failure control. By actively excluding such a situation, the frequency of reducing the regenerative braking force is not increased uselessly, so it is possible to appropriately reduce an opportunity for the occupant to experience a feeling of strangeness at the time of braking the hybrid vehicle 10. The parameter may be, for example, the depression force of the brake pedal, the hydraulic pressure of working fluid in the friction braking device, whether ABS control is executed, a road surface friction coefficient, or the like, other than the stroke of the brake pedal. When the control unit, for example, quickly brakes the vehicle on the basis of the above-described parameter, it is possible to raise the rate of reduction in the regenerative braking force within the specific period. Alternatively, when the control unit, for example, slowly brakes the vehicle on the basis of the above-described parameter, it is possible to decrease the rate of reduction in the regenerative braking force within the specific period. Thus, it is possible to further effectively suppress fluctuations in the deceleration of the vehicle without rapidly reducing the regenerative braking force within the specific period, so it is possible to prevent the occupant from experiencing a feeling of strangeness.

On the other hand, as shown in FIG. 5, the brake ECU 41 according to the present embodiment gradually increases the friction braking force that is generated by the friction brake device 30 from zero to the target braking force within the specific period J. That is, the brake ECU 41 according to the present embodiment keeps the target braking force determined in correspondence with driver's brake operation by increasing the friction braking force with the amount of reduction in the regenerative braking force. Thus, the brake ECU 41 suitably suppresses fluctuations in the braking force that is applied to the wheels 17.

More specifically, the brake ECU 41 gradually increases the friction braking force that is generated by the friction brake device 30 to the target braking force within the specific period J as shown in FIG. 5 in synchronization with a gradual reduction in the regenerative braking force to zero as described above. That is, in order to keep the target braking force in a situation that the regenerative braking force reduces, the brake ECU 41 gradually increases the friction braking force with the amount of reduction in the regenerative braking force such that the friction braking force set to zero at the operation detection timing T3 that is the start point of the specific period J becomes the target braking force at the predetermined timing T1 that is the end point of the specific period J, that is, the predetermined timing t1 at which the regenerative braking force reduces to zero.

More specifically, when the brake ECU 41 acquires the operation information at the operation detection timing T3, regulates the hydraulic pressure, output from the power hydraulic pressure generating unit 33, with the use of the linear control valves 367 of the hydraulic control valve unit 35 in accordance with cooperative control, and transmits the hydraulic pressure to the wheel cylinders 343. Thus, the brake ECU 41 gradually increases the friction braking force, which is applied to the wheels 17, to the target braking force within the specific period J.

In this way, within the specific period J, the brake ECU 41 brings the regenerative braking force into coincidence with the target braking force at the operation detection timing T3 that is the start point and brings the friction braking force into coincidence with the target braking force at the predetermined timing T1 that is the end point. That is, the brake ECU 41 gradually reduces the regenerative braking force and gradually increases the friction braking force such that the target braking force is generated by sequentially substituting the regenerative braking force with the friction braking force with a lapse of the specific period J.

As described above, the brake ECU 41 is able to change the rate of reduction in the regenerative braking force within the specific period J as needed on the basis of the parameter indicating the state associated with braking. The brake ECU 41 is able to increase the friction braking force on the basis of the amount of reduction in the regenerative braking force. Thus, the brake ECU 41 is able to selectively set the rate of reduction at which the regenerative braking force is gradually reduced and the rate of increase at which the friction braking force is gradually increased. With this configuration, the brake ECU 41 is able to change the mode of substituting the regenerative braking force with the friction braking force, in other words, the rate at which the regenerative braking force is gradually reduced and the friction braking force is gradually increased, as needed. Thus, it is possible to extremely smoothly substitute the regenerative braking force with the friction braking force within the specific period J.

As can be understood from the above description, according to the above-described embodiment, while the hybrid vehicle 10 in traveling is being braked, the brake ECU 41 is able to detect the occupant's specific operation of the main switch 21 at the operation detection timing T3 before the predetermined timing T1 at which energization of the motor generator 14 is interrupted. Thus, the brake ECU 41 is able to gradually reduce the regenerative braking force to the predetermined value (zero) within the specific period J from the operation detection timing T3 to the predetermined timing T1. In addition, the brake ECU 41 is able to gradually increase the friction braking force to the target braking force within the specific period J. Thus, it is possible to effectively suppress fluctuations in the braking force that is applied to the wheels 17, so it is possible to suitably prevent the occupant from experiencing a feeling of strangeness resulting from fluctuations in deceleration.

Specifically, as shown in FIG. 5, the brake ECU 41 has already reduced the regenerative braking force to zero (predetermined value) by the predetermined timing T1 at which energization of the motor generator 14 is interrupted by the hybrid ECU 47. Thus, even when energization of the motor generator 14 is interrupted thereafter and the regenerative braking force is not applied, the braking force that is applied to the wheels 17 does not fluctuate. On the other hand, as shown in FIG. 5, the brake ECU 41 has already increased the friction braking force to the target braking force by the predetermined timing T1 by operating the friction brake device 30, and has completed substituting the regenerative braking force with the friction braking force. Thus, with this configuration as well, even when energization of the motor generator 14 is interrupted and the regenerative braking force is not applied thereafter, the braking force that is applied to the wheels 17 does not fluctuate.

Therefore, in the hybrid vehicle 10, as shown in FIG. 5, at the predetermined timing T1 at which the hybrid ECU 47 shuts down the power supply circuit 20 and interrupts energization of the motor generator 14, the friction braking force that coincides with the target braking force has been already applied to the wheels 17, and a state where the braking force temporarily reduces does not occur. In addition, even at the timing T2 at which the predetermined timing T1 has been passed by and the brake ECU 41 detects the power-off operation, the state where the friction braking force is continuously applied to the wheels 17 and the hybrid vehicle 10 is being appropriately braked is kept. As a result, the occupant does not sense fluctuations in deceleration, resulting from a temporary reduction in the braking force (see the period from the predetermined timing T1 to the timing T2 in the vehicle speed surrounded by the alternate long and short dashed line in FIG. 5), and does not experience an uncomfortable feeling of strangeness.

In the above-described embodiment, the brake ECU 41 detects the occupant's specific operation of the main switch 21 by acquiring the operation information from the main switch 21 at the operation detection timing T3. The brake ECU 41 gradually reduces the regenerative braking force to the predetermined value including zero in the period from the operation detection timing T3 to the predetermined timing T1 at which the power supply circuit 20 is shut down by the hybrid ECU 47, in other words, the predetermined timing T1 at which energization of the motor generator 14 is interrupted. In the above-described embodiment, as shown in FIG. 4 and FIG. 5, when the hybrid ECU 47 detects (determines) the driver's power-off operation of the main switch 21, the hybrid ECU 47 immediately shuts down the power supply circuit 20 at the predetermined timing T1, and stops the operation of the motor generator 14 by interrupting energization of the motor generator 14.

In this case, when the regenerative braking force is being generated at the operation detection timing T3, even when the hybrid ECU 47 has detected (determined) the power-off operation of the main switch 21 at the predetermined timing T1 the hybrid ECU 47 is able to not completely shut down the power supply circuit 20 unlike the above-described embodiment but extend a time to interruption of energization of the motor generator 14 to the timing after the predetermined timing T1. In this way, the hybrid ECU 47 extends a time to interruption of energization of the motor generator 14. Thus, the brake ECU 41 is able to gradually reduce the regenerative braking force to the predetermined value within the extended time. Hereinafter, this alternative embodiment will be specifically described with reference to FIG. 6.

As shown in FIG. 6, in this alternative embodiment as well, the following situation is assumed. That is, while the hybrid vehicle 10 in traveling is being braked by generating the regenerative braking force, the specific operation the main switch 21 is conducted by the occupant, and the power-off operation is carried out. In this alternative embodiment as well, as shown in FIG. 6, the hybrid ECU 47 detects (determines) the power-off operation of the main switch 21 at the timing earlier than the brake ECU 41 does. In this alternative embodiment, as shown in FIG. 6, only the case where the regenerative braking force is controlled will be described. However, in this alternative embodiment as well, as well as the above-described embodiment, of course, it is possible to gradually increase the friction braking force that is generated by the friction brake device 30 in synchronization with a gradual reduction in the regenerative braking force.

When the hybrid ECU 47 according to the alternative embodiment detects (determines) the power-off operation, the hybrid ECU 47 detects (determines) the power-off operation at the predetermined timing T1 as in the case of the above-described embodiment as indicated by the long dashed line in FIG. 6. The hybrid ECU 47 interrupts energization of electrical devices, not including the motor generators 13, 14 and mounted on the hybrid vehicle 10, on the basis of the detection (determination) of the power-off operation, that is, in accordance with an occupant's intention. Specifically, the electrical devices not including the motor generators 13, 14 may be, for example, a display device (display) and an audio device that are provided in an instrument panel, a communication unit, that carries out information communication required to operate these devices. Thus, in this alternative embodiment, the hybrid ECU 47 interrupts energization of electrical devices, not including the motor generators 13, 14, in accordance with the power-off operation at the predetermined timing T1; however, energization of the motor generators 13, 14 continues to timing T4 at which a predetermined time elapses. That is, in this alternative embodiment, as shown in FIG. 6, a time to when the hybrid ECU 47 completely shuts down the power supply circuit 20 and interrupts energization of the motor generator 14 is extended to the timing T4 after the predetermined timing T1.

In this alternative embodiment, as shown in FIG. 6, the brake ECU 41 gradually reduces the regenerative braking force to zero that is the predetermined value while energization of the motor generator 14 is continued by the hybrid ECU 47 up to the timing T4. In this case as well, as in the case of the above-described embodiment, the brake ECU 41 directly controls the operation of the inverter circuit 205 that forms the power supply circuit 20 of the power converter 19 or the brake ECU 41 controls the operation of the inverter circuit 205 of the power supply circuit 20 in cooperation with the hybrid ECU 47. Thus, the regenerative braking force that is generated by the motor generator 14 is gradually reduced to zero. In this way, when the brake ECU 41 gradually reduces the regenerative braking force to zero by the timing T4, the hybrid ECU 47 shuts down the power supply circuit 20 at the timing T4. Thus, the hybrid ECU 47 stops the operations of the motor generators 13, 14.

As can be understood from the above description, in this alternative embodiment, originally, the hybrid ECU 47 interrupts energization of the motor generator 14 at the predetermined timing T1, but the timing at which energization of the motor generator 14 is interrupted is allowed to be extended to the timing T4. That is, a time to interruption of energization of the motor generator 14, which is taken when the regenerative braking force is being generated, is set to be longer than the time that is taken when the regenerative braking force is not being generated. The brake ECU 41 is able to gradually reduce the regenerative braking force to zero (predetermined value) by the extended timing T4. Thus, in this alternative embodiment, because the regenerative braking force has been already reduced to zero (predetermined value) at the timing T4, even when the power supply circuit 20 is completely shut down by the hybrid ECU 47 and energization of the motor generator 14 is interrupted, a rapid reduction in the regenerative braking force does not occur. Thus, the driver or the occupant does not sense fluctuations in deceleration, resulting from a reduction in the braking force, so it is possible to prevent the driver or the occupant from experiencing a discomfort or an insecurity.

The invention is not limited to the above-described embodiment and the above-described alternative embodiment. The invention may be implemented in various forms without departing from the object of the invention.

For example, in the above-described embodiment, the brake ECU 41 acquires the operation information (signal) from the main switch 21 at the operation detection timing T3. When the brake ECU 41 acquires the operation information at the operation detection timing T3 while the hybrid vehicle 10 is being braked by the use of the regenerative braking force, the brake ECU 41 gradually reduces the regenerative braking force to the predetermined value (zero) and gradually increases the friction braking force to the target braking force by the predetermined timing T1 at which the hybrid ECU 47 shuts down the power supply circuit 20 and interrupts energization of the motor generator 14. Thus, it is possible to suitably suppress fluctuations in the braking force that is applied to the wheels 17, so the occupant does not experience a feeling of strangeness resulting from fluctuations in deceleration.

Incidentally, as described above, in the hybrid vehicle 10 according to the related art, when the occupant conducts the power-off operation of the main switch 21, energization of the motor generator 14 is preferentially interrupted, and the regenerative braking force rapidly reduces. As described above, because of the rapid reduction in the regenerative braking force, fluctuations in the braking force that is applied to the wheels 17 occur. In this case, as the regenerative braking force that has been applied to the wheels 17 increases, more specifically, as the regenerative braking force that has been applied to the wheels 17 immediately before energization of the motor generator 14 is interrupted increases, fluctuations in the braking force, resulting from a rapid reduction in the regenerative braking force, increase, with the result that the occupant experiences a feeling of strangeness from fluctuations in deceleration.

Thus, when the brake ECU 41 has acquired the operation information at the operation detection timing T3, the brake ECU 41 is able to gradually reduce only the regenerative braking force to the predetermined value by the predetermined timing T1 at which the power supply circuit 20 is interrupted by the hybrid ECU 47 and energization of the motor generator 14 is interrupted. With this configuration, at the predetermined timing T1 at which energization of the motor generator 14 is interrupted, the regenerative braking force is allowed to be reduced to at least the predetermined value set as such a braking force that the occupant does not experience a feeling of strangeness. Thus, even when energization of the motor generator 14 is interrupted and the regenerative braking force is not applied to the wheels 17, it is possible to suppress a rapid decrease in deceleration, so the driver or the occupant does not experience a feeling of strangeness.

In this case, the brake ECU 41 does not actively increase the friction braking force for a reduction in the regenerative braking force unlike the above-described embodiment. Therefore, when the driver senses a gradual reduction in the braking force that is applied to the wheels 17 while braking the hybrid vehicle 10, the driver is, for example, able to conduct brake operation by further depressing the brake pedal 311. Thus, the brake ECU 41 is able to raise the hydraulic pressure that is supplied to the wheel cylinders 343 by increasing the target friction braking force in response to driver's brake operation. Thus, in this case as well, it is possible to reliably stop the hybrid vehicle 10 in response to driver's brake operation, so it is possible to suitably prevent the occupant from experiencing an insecurity.

In the above-described embodiment, the brake ECU 41 acquires the operation information that is indicated by the signal that is output from the main switch 21. The brake ECU 41 gradually reduces the regenerative braking force to the predetermined value (zero) within the specific period J from the operation detection timing T3 at which the operation information is acquired to the predetermined timing T1 at which the power supply circuit 20 is interrupted (shut down) by the hybrid ECU. In this case, instead of the configuration that the brake ECU 41 acquires the operation information from the main switch 21, the brake ECU 41 itself may be configured to detect the occupant's specific operation of the main switch 21 directly or indirectly.

In this case as well, the brake ECU 41 is able to gradually reduce the regenerative braking force to the predetermined value (zero) in the period from the timing at which the specific operation of the main switch 21 has been detected, that is, the operation detection timing T3, to the predetermined timing T1 at which the power supply circuit 20 is interrupted (shut down) by the hybrid ECU 47 and energization of the Motor generator 14 is interrupted. Thus, in this case as well, even when energization of the motor generator 14 is interrupted and the regenerative braking force is not applied to the wheels 17, it is possible to suppress a rapid decrease in deceleration, so the occupant does not experience a feeling of strangeness.

In the above-described embodiment, as shown in FIG. 5, the brake ECU 41 acquires the operation information output from the main switch 21, and gradually reduces the regenerative braking force and gradually increases the friction braking force from the operation detection timing T3 at which the operation information has been acquired. In this case, the brake ECU 41 does not necessarily bring the timing at which a reduction in the regenerative braking force is started and the timing at which an increase in the friction braking force is started into coincidence with each other within the period from the timing at which the operation information has been acquired to the timing T1 at which energization of the motor generator 14 is interrupted, that is, within the specific period J. In addition, for example, as described above, when only the regenerative braking force is gradually reduced to the predetermined value as well, the timing at which a reduction in the regenerative braking force is started is not limited to the timing T3 at which the operation information has been acquired as long as the timing falls within the specific period J.

Specifically, within the specific period J, the brake ECU 41 is, for example, able to reduce the regenerative braking force from the operation detection timing T3, whereas the brake ECU 41 gradually increases the friction braking force from timing that is earlier than the predetermined timing T1 at which energization of the motor generator 14 is interrupted and that is temporally later than the timing T3. Alternatively, within the specific period J, the brake ECU 41 is, for example, able to start preparations for increasing the friction braking force by operating the friction brake device 30 from the operation detection timing T3, and to gradually reduce the regenerative braking force to the predetermined (zero) from the timing that is later than the timing T3 and that is determined on the basis of the operation detection timing T3.

In this case as well, the brake ECU 41 is able to gradually reduce the regenerative braking force to the predetermined value (zero) within the specific period J by the predetermined timing T1 at which the power supply circuit 20 is interrupted (shut down) by the hybrid ECU 47 and energization of the motor generator 14 is stopped at the latest. On the other hand, the brake ECU 41 is able to gradually increase the friction braking force to the target braking force by the predetermined timing T1 at the latest within the specific period J. Thus, even when energization of the motor generator 14 is interrupted and the regenerative braking force is not applied to the wheels 17, it is possible to suppress a rapid decrease in deceleration, so the occupant does not experience a feeling of strangeness.

In the above-described embodiment, the above-described alternative embodiment and the above-described modifications, the brake ECU 41 that constitutes the control unit 20 controls a reduction in the regenerative braking force and an increase in the friction braking force. In these cases, the hybrid ECU 47 that constitutes the control unit may control a reduction in the regenerative braking force and an increase in the friction braking force. In this case, the hybrid ECU 47, for example, controls the operation of the friction brake device 30 in cooperation with the brake ECU 41. Therefore, advantageous effects equivalent to those of the above-described embodiment, and the like, are obtained. Alternatively, a new electronic control unit (ECU) that integrates the function of the brake ECU 41 and the function of the hybrid ECU 47 may be employed as the control unit.

In the above-described embodiment, the above-described alternative embodiments, the friction brake device 30 that uses hydraulic pressure and that supplies the hydraulic pressure of working fluid to the wheel cylinders 343 is employed as the friction braking device. In this case, a disc brake unit (brake device) may also be employed as the friction braking device. For example, a disc brake device (brake device) may be employed such that brake pads (friction members) are pressed against a disc rotor (rotating member) by an electric motor.

The invention claimed is:

1. A vehicle comprising:
   a friction braking device configured to generate a friction braking force;
   a generator motor configured to generate a regenerative braking force;
   and electronic control unit configured to:
   adjust the friction braking force and adjust the regenerative braking force by controlling an energization of the generator motor to generate a braking force that is required by the vehicle,
   interrupt energization of the generator motor at a predetermined time after an occupant's specific operation of a main switch to shut down a power supply to the generator motor is detected, the occupant's specific operation of the main switch being a predetermined operation of the main switch that occurs within or is equal to a predetermined threshold time, and
   control the regenerative braking force to gradually reduce the regenerative braking force within a specific period for the detection of the occupant's specific operation of the main switch to the predetermined time of the interrupting energization of the generator motor,
   wherein the reduction of the regenerative brake force is independent of a speed of the vehicle.

2. The vehicle according to claim 1, wherein
the electronic control unit is configured to gradually increase the friction braking force within the specific period.

3. The vehicle according to claim 2, wherein
the electronic control unit is configured to increase the friction braking force with an amount of force equal to the reduction in the regenerative braking force to maintain generation of the braking force that is required by the vehicle within the specific period.

4. The vehicle according to claim 1, wherein
the occupant's specific operation of the main switch is an operation of a switch that is used at the time of changing from an energized state where an electrical device mounted on the vehicle is energized to a non-energized state where energization of the electrical device is interrupted, and
the electronic control unit is configured to interrupt energization of the generator motor by at least interrupting an energization path to the generator motor at the predetermined time.

5. The vehicle according to claim 1, wherein
the electronic control unit is configured to set, when the occupant's specific operation of the main switch to shut down a power supply to the generator motor is detected, a time to interruption of energization to be longer than a time set for the electronic control unit to reduce the regenerative braking force so that the regenerative braking force is not being generated by the generator motor.

6. The vehicle according to claim 1, wherein
the electronic control unit is configured to start reducing the regenerative braking force at a time the occupant's specific operation is detected or after the occupant's specific operation is detected, the time being determined on the basis of a timing from the occupant's specific operation of the main switch and the detection of the occupant's specific operation of the main switch by the electronic control unit.

7. The vehicle according to claim 1, wherein
the electronic control unit is configured to change a rate of reduction in the regenerative braking force within the specific period on the basis of a parameter indicating a state associated with braking.

* * * * *